M. S. TOWSON.
INDUSTRIAL TRUCK
APPLICATION FILED JUNE 4, 1915.
1,233,824.
Patented July 17, 1917.
3 SHEETS—SHEET 3.
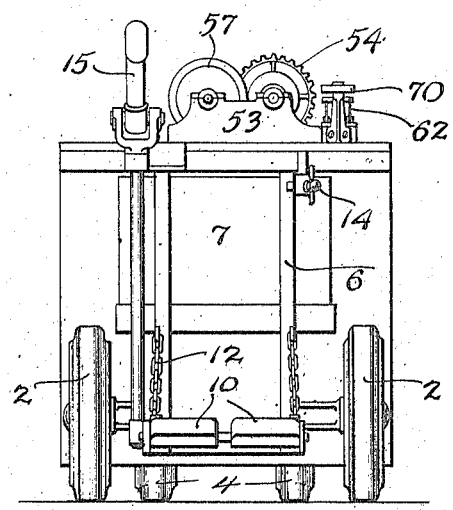
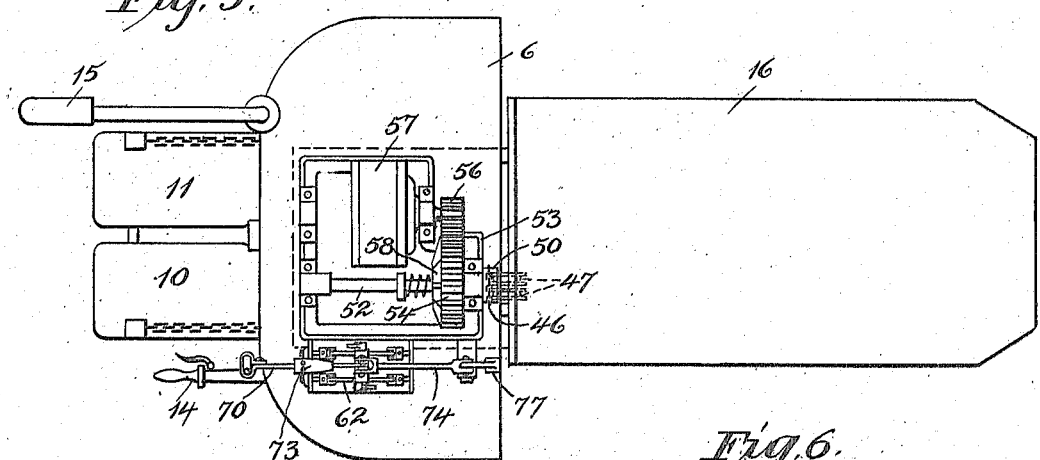
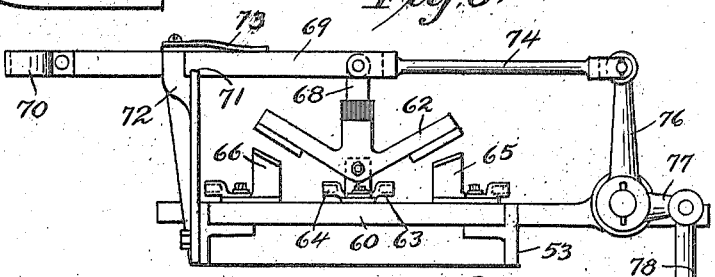
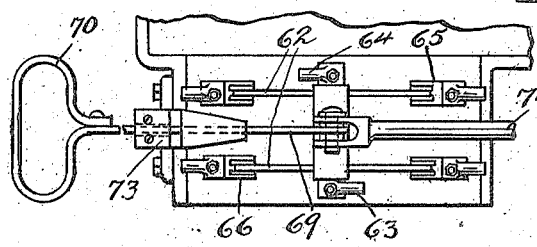
Inventor,
Morris S. Towson,
By Albert T. Baker,
Attorney.

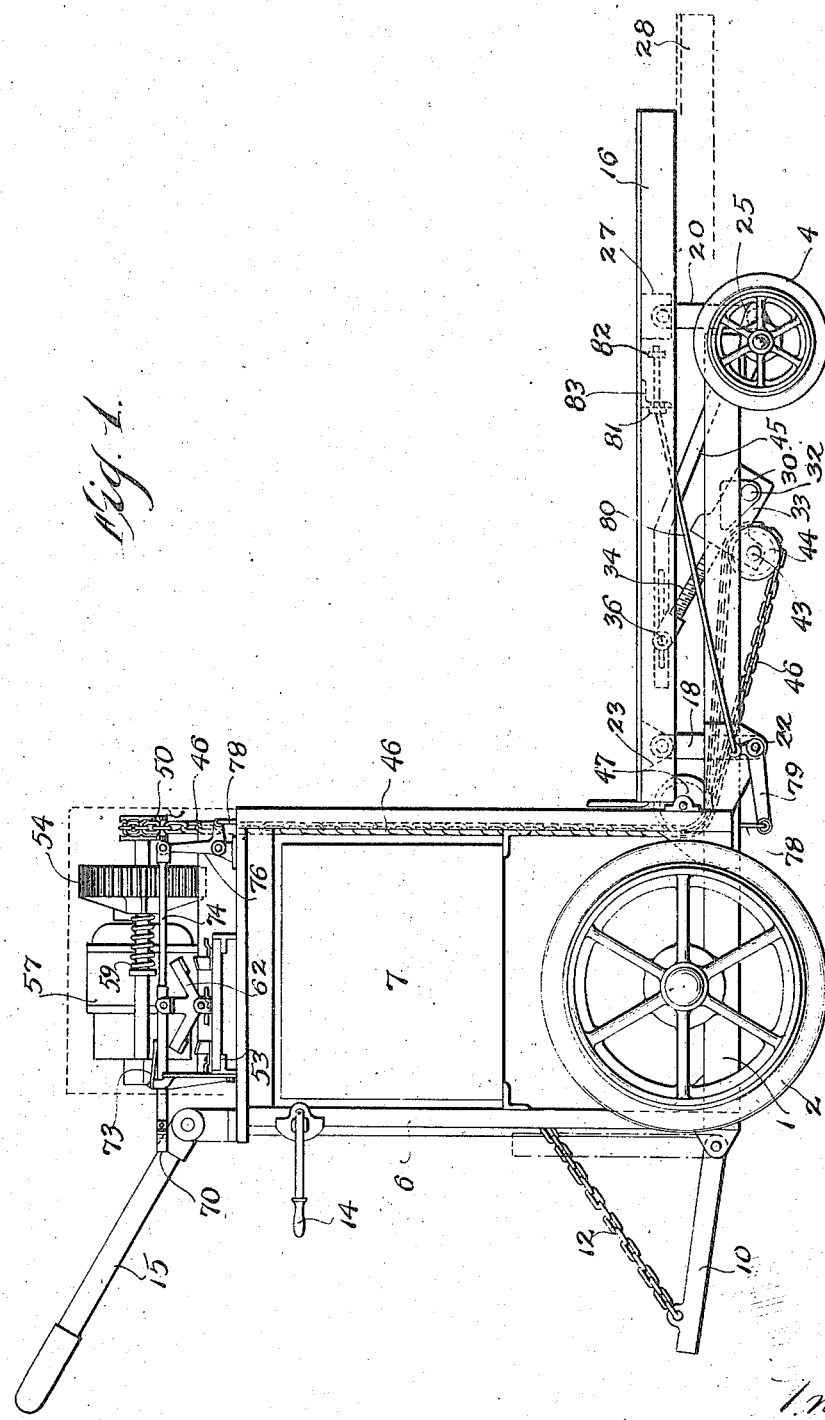

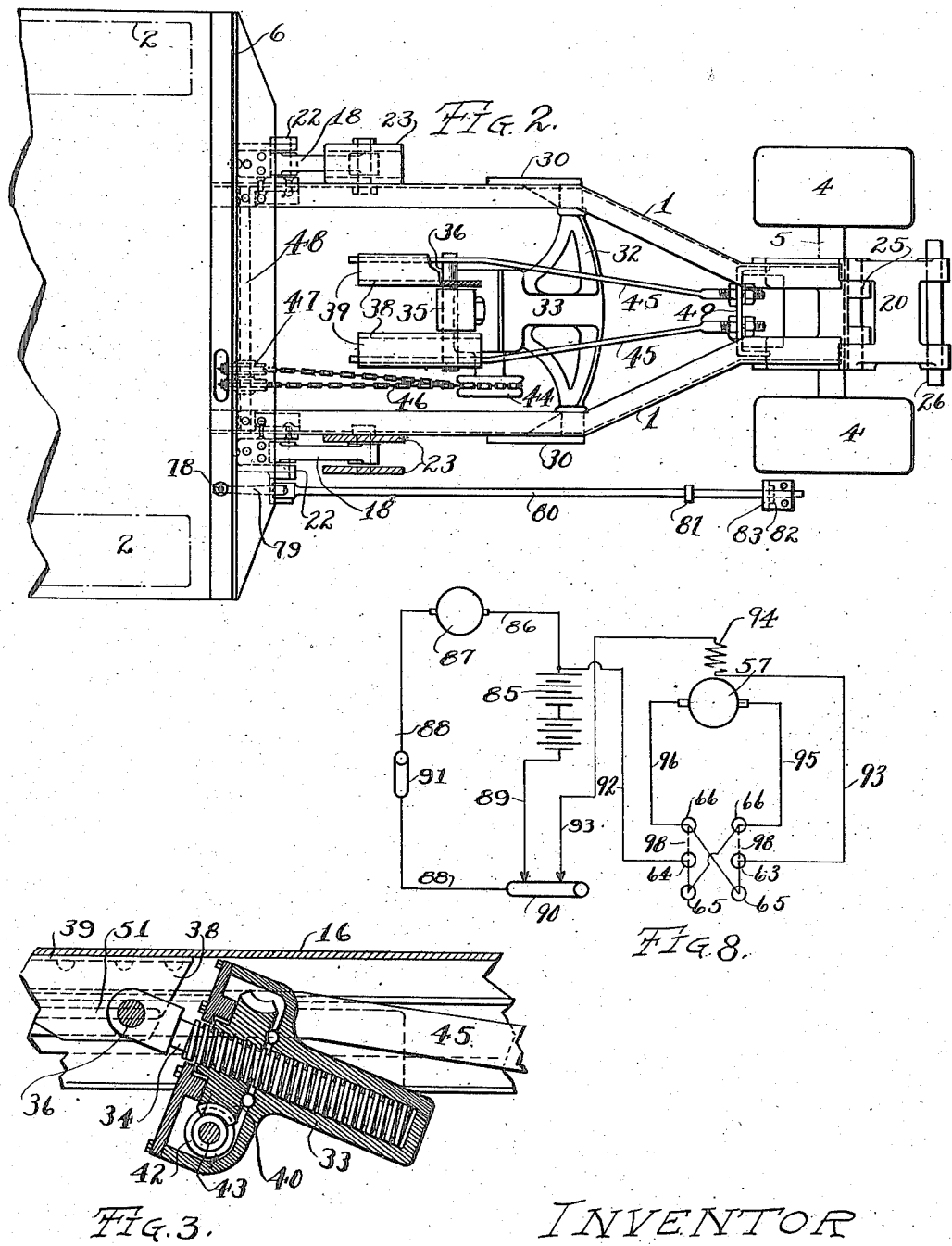

UNITED STATES PATENT OFFICE.

MORRIS S. TOWSON, OF CLEVELAND, OHIO, ASSIGNOR TO THE ELWELL-PARKER ELECTRIC COMPANY, OF CLEVELAND, OHIO, A CORPORATION OF OHIO.

INDUSTRIAL TRUCK.

1,233,824.      Specification of Letters Patent.      Patented July 17, 1917.

Application filed June 4, 1915. Serial No. 32,201.

*To all whom it may concern:*

Be it known that MORRIS S. TOWSON, a citizen of the United States, residing at Cleveland, in the county of Cuyahoga and State of Ohio, have invented a certain new and useful Improvement in Industrial Trucks, of which the following is a full, clear, and exact description, reference being had to the accompanying drawings.

This invention relates particularly to industrial trucks, and has for its principal object the provision of a power operated elevating support adapted to be thrust under a raised movable platform loaded with goods, and then raised with relation to the truck to pick up the platform with the goods thereon and transport the same to any desired point, where they may be deposited by lowering the platform support of the truck. The platforms on which the goods may be piled are preferably raised from the floor on separated supports, so that a portion of the truck may be moved bodily under them, allowing the raisable support to engage them. The supports for such a platform may be rigid therewith, thus providing in effect a table under which the truck is thrust for raising it free from the floor and conveying it to a different point.

Industrial trucks are usually driven by storage batteries, and another object of this invention is to provide an efficient electrically driven operating mechanism for raising and lowering the elevating support of the truck independently of the mechanism for driving the truck. In the embodiment shown in the drawings the truck is partially controlled by automatically raisable platforms on which the operator stands. Such a controlling device is shown and described in the prior patent to C. E. F. Ahlm and C. E. Cochran, No. 1,069,991, on a motor truck, granted August 12, 1913, and I prefer to so arrange the circuits for the driving mechanism and the mechanism operating the elevating support that they may both be controlled by one of the platforms and automatically shut off whenever the weight of the operator is relieved from such platforms.

Other features of my invention are hereinafter more fully described in connection with the drawings, and the essential characteristics are set forth in the claims.

Referring to the drawings, Figure 1 is a side elevation of a truck embodying my invention; Fig. 2 is a sectional plan of the rear portion of the truck, showing the means carrying the operating platform, the view being taken with the platform removed; Fig. 3 is a vertical sectional detail of the screw-operated raising mechanism for the platform; Fig. 4 is a front elevation on a reduced scale, of the truck; Fig. 5 is a plan of the same; Fig. 6 is a side elevation of a switch for controlling the motor-operating elevating platform; Fig. 7 is a plan of the same; Fig. 8 is a wiring diagram, illustrating a suitable arrangement of battery circuits for the two motors.

Referring to the drawings by reference numerals, 1 indicates a horizontal truck frame comprising side members and suitable cross members and carried at the forward end on wheels indicated at 2 and at the rear end on smaller wheels 4 arranged closer together than the forward wheels, the side members of the frame being brought together and supported on the rear axle 5 between the wheels. At the forward portion of the truck is an upright box-like frame 6 adapted to contain storage batteries, indicated at 7, as well as driving and controlling mechanism, not shown. Pivotally secured to the front of the frame are pedals or short foot platforms 10 and 11, one for each foot of the operator, which are supported at their forward sides by chains 12 leading to their outer ends, tending to draw upwardly and adapted to operate respectively a controlling switch and brake. The truck propelling mechanism is controlled by a suitable controlling lever indicated at 14, and a steering lever 15 is provided, as fully shown and described in the above mentioned patent.

Above the frame 1 at the rear of the upright portion 6, I have provided an elevating support 16 which is preferably a flat platform extending rearwardly over the small wheels 4. This support is carried on pivoted arms 18 and 20 so that it may be raised and lowered with relation to the frame. The arms 18 are pivoted at their lower ends to brackets 22, secured outside of the members of the frame 1, and at their upper ends to downwardly extending brackets 23 secured to the under side of the elevating platform 16. The arms 20 are preferably formed on a single integral casting, as shown in Fig. 2, and pivoted to ears 25 extending rearwardly from the axle 5. The arms 20 carry at their upper ends a pin 6 adapted to be received by downwardly extending ears or bracket members 27 secured to the under side of the platform. These pivoted arms are so arranged that when in their vertical position, as in Fig. 1, the elevating platform is at its highest point, and when the platform is lowered these arms are swung rearwardly, bringing the platform to the lower position, as indicated by broken lines at 28. Means for raising and lowering the platform 16 will now be described.

Secured to the frame members 1 are a pair of depending brackets 30, adapted to receive trunnions on a casting member 32, extending between the frame members and carrying at the middle portion a casing 33 adapted to receive a screw 34 which is provided with a head 35 pivotally engaging a transverse pin 36, shown as extending through depending flanges 38 of a pair of angle brackets 39 secured to the under side of the platform 16 ahead of the screw just described. The angle of the screw with relation to the platform and the swinging arms 18 and 20 is preferably such that when the screw is moved into and out of its casing it may act most efficiently to raise and lower the platform. Within an enlarged portion of the casing 33 I have provided a nut 40 engaging the threads of the screw 34 and having worm teeth on its periphery whereby it may be driven by a threaded worm 42 on a shaft 43 carrying at the outer end a wheel 44 having pockets of the usual form (not shown) adapted to receive the links of a chain 46. The chain 46 extends forwardly from the wheel 44 to a pair of guide pulleys 47 on a transverse shaft 48 and thence vertically to a smaller wheel 50, also provided with pockets for the links and adapted to drive the chain to rotate the nut 40 in either direction and thereby raise and lower the platform 16 through the mechanism described.

It will be noticed from the construction just described that the platform support 16 may be stopped in any portion of its movement and there locked automatically by the nut 40, and its worm gear driving mechanism, for any tendency of the nut 40 to rotate would be prevented by the worm teeth 42 on the shaft 43. As a means for limiting the movement of the elevating support, I have shown a pair of rods 45 comprising flat strips having at one end threaded portions extending through a cross member 49 secured to a narrow portion of the frame 1 and held to this member 49 by suitable nuts. The members 45 extend forwardly and are provided near their forward ends with longitudinal slots 51 adapted to slidably receive the flattened ends of the pin 36. As the platform rises these members 45 are sprung upwardly and the movement may be limited consequent upon the flattened end of the pin 36 coming to the ends of the slots 51. When the platform comes to its lower position it preferably rests on the frame 1 or any suitable stops carried thereby.

The chain wheel 50 is rigidly carried on a shaft 52 supported in a suitable frame 53 and having a gear 54 adapted to be driven by a pinion 56 on the shaft of a motor indicated at 57, and also secured to the frame 53. The rotation of the gear 54 is transmitted to the shaft 52, on which it is carried, through a friction clutch member 58 slidably keyed to the shaft 52 and pressed into engagement with the gear by a spring 59 surrounding the shaft. Thus if the driving movement of the platform mechanism is inadvertently stopped, this clutch may allow the motor to continue to rotate, thereby preventing serious injury to the parts.

The motor is adapted to rotate in either direction, thereby driving the wheel 50 through the gears 56 and 54 described. A suitable switch for controlling this motor and so directing the current as to drive the same in opposite directions is shown in Figs. 5 and 6, in which 60 indicates a base plate mounted on extended portions of the frame 53 and carrying pivoted double knife switch members 62, which are connected with feed terminals 63 and 64. Each side of the double knife switch member is adapted to engage a pair of spring contacts 65 and 66 connected with terminals to which may lead the field and armature wires of the motor 57. This switch is preferably provided with an upwardly extending insulated eye 68, to which is pivotally connected an operating rod 69 provided with a handle 70. The rod is shown as having a notch 71 engaging a projection on the guide 72, which carries a spring 73 pressing the rod toward the guide so that the notch may be held in engagement.

Extending from the eye 68 in the opposite direction is a link 74 pivotally connected to an upwardly extending arm of a bell crank 76 having an arm 77 pivotally connected with a vertical rod 78 leading downwardly to a bell crank 79 (indicated in dotted lines in Fig. 3), which is operated by a rod 80. The rod 80 is provided with spaced collars or stops 81 and 82 adapted to be engaged by a depending ear 83, through which the rod slidably extends and which is secured to the under side of the platform 16. Now it will be seen that as the platform is raised and lowered, thereby moving it forwardly and rearwardly, the ear 83 will engage the collars 81 and 82, when it reaches its upper and lower positions respectively. Such engagement will move the rod longitudinally, and through the bell crank 79, rod 78, bell crank 76 and link 74, will move the switch knives 62, thereby throwing the same out of contact and bringing the notch 71 in the rod 69 into a position to engage its projection on the support 72, thereby stopping the motor and latching the switch against inadvertent movement. The motor may be started in either direction to raise or lower the platform, by raising the handle 70 to disengage the notch just mentioned, and then thrusting or pulling on the handle, throwing the switch and closing the circuit through one or the other set of contacts 65 or 66.

A suitable cover or casing, as indicated in broken lines at 84, may be used to cover the switch mechanism and motor and driving mechanism.

The diagram shown in Fig. 7 illustrates a suitable arrangement of the battery and wiring connections for the motor for driving the truck and for the motor operating the elevating platform. In this figure 85 indicates a battery connected by a line 86 with a motor 87, adapted to drive the truck. The other side of the motor is connected by a return wire 88, switch 90 and wire 89, at the other side of the battery, thereby completing the circuit. At 91 is indicated a switch controlling this circuit and which may be illustrative of any suitable controller mechanism. The motor 57 is preferably connected with the battery 85, by a line 92. The other intermediate terminal 63 is connected by a line 93 leading through the field indicated at 94, and to the switch 90. The armature of the motor 57 is shown as connected by lines 95 and 96 with the contacts 66 of the switch heretofore described. Now with the arrangement described, it will be seen that when the switch 90 is closed the circuit through the driving motor 87 may be controlled by the switch or controller 91, and at the same time the motor 57 operated by the portion of the battery in its circuit.

A suitable mechanism by which one platform 10 may control the operation of the motor and particularly that of the switch 90, which may be part of a controller, is shown, described and claimed in the patent to Clyde E. Cochran No. 1,073,397, granted September 16, 1913. The use of the other platform and chain may be that of a brake operating in a manner as shown, described and claimed in the patent to Ahlm and Cochran, No. 1,069,991, granted August 12, 1913.

The motor may be driven in one direction by passing current from the battery through the wire 89, switch 90, line 93 and field 94 to the terminal 63, and if the switch controlling this motor is in a position diagrammatically indicated by the solid lines, the current will pass from the terminal 63 to the contact 66 and over to the opposite contact 66, through the line 96, armature of the motor, and line 95, and from the other contact 66 to the diagonally opposite contact 65, terminal 64, line 92, and back to the battery. When the switch is thrown in the opposite direction, the current passes from the battery through the lines 89, switch 90, lines 93, and field 94, to the terminal 63, as before. Now with the switch thrown to the position indicated in broken lines at 98, the current will pass to the adjacent terminal 66, through the line 95, and through the armature in the direction opposite to that just described, returning from the armature through the line 96, the other terminal 66, and the other line 98, through the line 92 and thence to the battery.

It will be seen from the above description of the diagram that if the switch 90 is opened the circuits through both motors will be broken, this switch being common, and if this switch is controlled by one of the platforms 10 on which the operator stands it is obvious that neither motor can be operated unless the operator is in the proper position.

It will thus be seen that I have provided a truck having a power operated elevating support controlled independently of the driving mechanism, by which I have accomplished the objects above set forth. Such support may be thrust under a platform on which a load of goods is resting, the platform then raised free from its supports by raising the elevating support of the truck, and as soon as the platform clears its supports the truck may be started toward its destination and the raising movement completed while the truck is traveling, thus saving considerable time. A similar saving may be made by beginning the lowering movement to deposit the loaded platform at the other end of the trip.

Having thus described my invention what I claim is:

1. In a truck, the combination of a front housing, a battery carried thereby, supporting wheels at the sides of said housing, a frame extending rearwardly from the housing near its lower end, a raisable platform carried by said frame, mechanism for raising said platform, a motor carried by the housing, connecting mechanism between the same and said raising mechanism, and electric connections between said motor and the battery.

2. The combination in a truck, of an under frame, an elevating support, parallel pivoted arms connecting said support with the under frame, mechanism for raising and lowering the support adapted to push against the same in a diagonal direction and pivotally connected to the under side of the support and to the under frame, said mechanism including a screw, a nut on the screw, and gearing for driving the nut.

3. The combination of a truck having a frame with spaced members, an elevating platform, links pivotally connecting the platform to the frame; raising and lowering mechanism including a screw pivotally connected to the under side of the platform, a housing, and a nut for the screw mounted in the housing, said housing having oppositely projecting trunnions which are mounted in said spaced members of the frame, and means for rotating the nut to raise the platform.

4. In a truck of the character described, the combination of a frame, wheels supporting the frame, an upright housing at one end of the frame, said frame extending rearwardly adjacent the ground, a platform surmounting the rearward extension of the frame, the rear wheels being comparatively small, and said platform overhanging the same, means for movably carrying said surmounting platform by the frame, mechanism for raising and lowering said platform, and a motor carried on the top of said housing for operating the raising mechanism.

5. The combination with a truck, of an under frame, a support carried by the frame adapted to be raised and lowered, parallel pivoted arms connecting the support with the frame and adapted to swing about their pivots as the support is raised and lowered, mechanism for causing such raising and lowering including a screw and nut, a member carrying said screw and pivoted to the frame, a motor, and means connecting the motor with said nut for rotating the same.

6. In a truck, the combination of an under frame, an elevating support, pivoted arms connecting said support with the under frame, mechanism for raising and lowering the support including a screw member and a nut on the screw, means carrying said nut and pivoted to the frame, means pivotally connecting the screw with the platform whereby the swinging movement of said arms may be caused by rotating the nut, a motor carried by the frame, and means connecting the motor with the nut for driving the same, including a flexible connection.

7. In a truck, the combination with a frame having a support, links pivoted to the support and to the frame, raising and lowering mechanism connected to the support and to the frame including a screw lying at an angle to the support and the frame, a nut on said screw, a member comprising a guide for the screw rotatably carrying the nut and pivoted to the frame, said nut having worm teeth on its periphery, a worm engaging said teeth and adapted to rotate the nut carried by said member, a motor carried by the frame, and means connecting the motor with said worm for rotating the nut.

8. In a truck, the combination with a frame, wheels supporting the frame, an elevating support above the frame, links pivoted to the support and to the frame, pivoted arms connecting the support and the frame, raising and lowering mechanism for the support including a screw member, a nut thereon, a housing member providing a guide for the screw member and rotatably carrying the nut, one of said members being pivoted to the frame and the other to the support, said nut having worm teeth on its periphery, a worm engaging such teeth and rotatably carried in said housing, a chain wheel for driving said worm, a motor carried by the frame, and a chain driven by the motor and running over said chain wheel.

9. In a truck, the combination with a frame having a support, links pivoted to the support and to the frame, raising and lowering mechanism connected to the support and to the frame including a screw lying at an angle to the support and the frame, a nut on said screw, a member comprising a guide for the screw rotatably carrying the nut and pivoted to the frame, said nut having worm teeth on its periphery, a worm engaging said teeth and adapted to rotate the nut carried by said member, a motor carried by the frame, means connecting the motor with said worm for rotating the nut, including a gear, a shaft for the same on which it is loosely mounted, and a clutch member connecting the gear with the shaft, and means for urging the clutch into frictional engagement.

10. In a truck, the combination of an under frame, an elevating support above a portion of the frame, pivoted arms connecting the support and the frame adapted to swing as the support is raised and lowered, a housing rising from the forward portion of the frame, a motor carried by said housing, mechanism for raising and lowering the support, driving means therefor connecting said mechanism with the motor, a source of current for the motor, a switch controlling the same, means including rods, links and a bell-crank connecting said switch with the support for opening said switch when the platform reaches its lowermost or uppermost position.

11. The combination, with an electric truck having a battery and motor-driven propelling means, of a vertically movable support adapted to be thrust under an article to raise the same, mechanism for raising the support, a motor for driving the last named mechanism and deriving its power from said battery, circuits for each of said motors, an individual controller in the circuit of the propelling motor, an automatic stopping switch in the circuit of the raising motor, and a safety switch common to both circuits.

12. The combination, with a truck, of a vertically movable support carried thereby and adapted to be thrust under articles to be raised, an electric motor, mechanism operated thereby for raising or lowering the support, a reversing switch having a pair of pivoted switch members, mechanism connecting the switch with the platform and adapted to throw the switch to neutral position when the platform reaches extreme upper or lower position, and a handle for throwing the switch from neutral to either active position.

In testimony whereof, I hereunto affix my signature.

MORRIS S. TOWSON.